US012769915B2

(12) United States Patent
Tehrani et al.

(10) Patent No.: US 12,769,915 B2
(45) Date of Patent: Oct. 20, 2026

(54) ENHANCED CELL MODELING FOR WAVEFORM PROPAGATION

(71) Applicant: Synopsys, Inc., Mountain View, CA (US)

(72) Inventors: Peivand Tehrani, Campbell, CA (US); Dustin Liu, Milpitas, CA (US); Xin Wang, Pleasanton, CA (US); Ahmed Shebaita, Fremont, CA (US)

(73) Assignee: Synopsys, Inc., Sunnyvale, CA (US)

( * ) Notice: Subject to any disclaimer, the term of this patent is extended or adjusted under 35 U.S.C. 154(b) by 993 days.

(21) Appl. No.: 17/304,110

(22) Filed: Jun. 14, 2021

(65) Prior Publication Data

US 2022/0398369 A1 Dec. 15, 2022

(51) Int. Cl.
*G06F 30/36* (2020.01)
*G06F 119/06* (2020.01)
*G06F 119/10* (2020.01)

(52) U.S. Cl.
CPC .......... *G06F 30/36* (2020.01); *G06F 2119/06* (2020.01); *G06F 2119/10* (2020.01)

(58) Field of Classification Search
CPC ... G06F 30/36; G06F 2119/10; G06F 2119/06
USPC .......... 703/14
See application file for complete search history.

(56) References Cited

U.S. PATENT DOCUMENTS 8,543,954 B1 * 9/2013 Keller ................ G06F 30/3312 716/108
9,928,324 B1 * 3/2018 Keller ................ G06F 30/3315
10,223,483 B1 * 3/2019 Tan ................ G06F 30/20
2006/0095871 A1 * 5/2006 Levy ................ G06F 30/3312 716/103
2008/0243414 A1 * 10/2008 Oh ................ G06F 30/367 702/85
2017/0004238 A1 * 1/2017 Sattiraju ................ G06F 30/367
2019/0325092 A1 10/2019 Ren et al.

FOREIGN PATENT DOCUMENTS

TW 200739111 A 10/2007
TW 200925825 A 6/2009

OTHER PUBLICATIONS

Christoph Knoth (Accurate Waveform-based Timing Analysis with Systematic Current Source Models, (132 pages). (Year: 2012).*

(Continued)

*Primary Examiner* — Andre Pierre Louis
(74) *Attorney, Agent, or Firm* — WOMBLE BOND DICKINSON (US) LLP

(57) ABSTRACT

Disclosed is a method and apparatus that determines receiver capacitance values for a receiver cell from a multi-segment receiver capacitance model (ClCn) model. Values for receiver capacitance are determined from a Composite Current Source for Noise (CCSN) model under conditions used to attain receiver capacitance values for the ClCn model. Difference values for the difference between the values from the CCSN model and from the ClCn model are determined. Calibration factors are iteratively applied to parameters of the CCSN model to obtain a minimum difference value for difference between receiver capacitance values from the CCSN model and receiver capacitance values from the ClCn model. Calibration factor values that result in the difference value being within an acceptable range are stored.

19 Claims, 10 Drawing Sheets

(56) References Cited

OTHER PUBLICATIONS

Amirtharajah, et al., "EED 116 Lecture #4: CMOS Inverter AC Characteristics", EEC 116 Fall 2011, 26 pgs.
Office action for Taiwanese Patent Application No. 111117329, dated May 22, 2026, 12 pages, and English translation, 6 pages.

* cited by examiner

ENHANCED CELL MODELING FOR WAVEFORM PROPAGATION

TECHNICAL FIELD

The present disclosure relates to systems and methods for characterizing the operation of an integrated circuit design and more particularly to accurately modeling waveform propagation through circuits of an integrated circuit design.

BACKGROUND

In today's integrated circuit chips, demand for low power consumption has pushed down chip operating voltages. Lower operating voltages result in a significant increase in analog effects, such as forward/backward Miller effect, long resistive/capacitive (RC) waveform tails and crosstalk. This is especially true for nets that have a high number of fanouts. Accordingly, such nets pose a significant challenge when attempting to accurately model the behavior of signals on these nets.

Existing Nonlinear Delay Model (NLDM), Composite Current Source for Timing (CCST) and Composite Current Source for Noise (CCSN) models are incapable of accurately modeling these effects. In particular, in lower geometries (smaller technology nodes) in which stage delays are typically relatively small, minor inaccuracies in the model at the gate level tend to get amplified to create larger errors. This can be problematic, leading designers to apply very high margins when using these models in order to make them safe. This can negatively impact performance, power and die area in the final circuit design.

SUMMARY

Embodiments of a method and apparatus are disclosed that operate to improve the accuracy of a model receiver cell used in fabrication of an integrated circuit. In some embodiments a method includes determining receiver capacitance values for a receiver cell from a multi-segment receiver capacitance model (C1Cn) model. Values for receiver capacitance are also determined from a Composite Current Source for Noise (CCSN) model under conditions used to attain receiver capacitance values for the C1Cn model. The difference between the values from the CCSN model and from the C1Cn model are determined and calibration factors are iteratively applied to parameters of the CCSN model to determine a minimum difference between receiver capacitance values from the CCSN model and receiver capacitance values from the C1Cn model. Once determined, calibration factor values that result in the difference being within an acceptable range are stored.

In some embodiments, the method further includes determining values for receiver capacitance for the receiver cell after the receiver cell has been calibrated, the values determined from a Composite Current Source for Noise (CCSN) model under conditions used to attain receiver capacitance values for the C1Cn model. A residual difference between the values from CCSN model and from the C1Cn model is determined and an adjustment value for the receiver capacitance based on the residual difference between receiver capacitance values from the CCSN model and receiver capacitance values from the C1Cn model are determined. The adjustment values are then stored.

In another embodiment, the disclosed method includes determining delay and slew values for a driver cell from a non-linear delay model (NLDM). Waveform tail values for the driver cell are determined from a Composite Current Source for Time (CCST) model. Delay and slew values for the driver cell from a CCSN model are determined under conditions used to attain delay and slew values for the NLDM. In addition, waveform tail values for the driver cell from a Composite Current Source for Noise (CCSN) model under conditions used to attain waveform tail values for the CCST model. The difference between the values of delay and slew are determined from the CCSN model and from the NLDM. The difference between the waveform tail values are determined from the CCSN model and from the CCST model. Calibration factors are applied iteratively to parameters of the CCSN model to determine minimum differences between delay and slew values from the CCSN model and delay and slew values from the NLDM and differences between waveform tail values from the CCSN model and waveform tail values from the CCST model. Once determined, the calibration factor values that result in the minimum differences are stored.

In some embodiments, this method further includes determining from a CCSN model under conditions used to attain delay and slew values for the NLDM, delay and slew values for the driver cell after the driver cell has been calibrated. Waveform tail values for the calibrated driver cell are determined from the CCSN model under conditions used to attain waveform tail values for the CCST model. The difference between values of delay and slew from CCSN model and from the NLDM are determined and the difference between waveform tail values from CCSN model and from the CCST model are determined. Compensation values for the delay slew and waveform tail values the CCSN are determined based on the differences in delay, slew and waveform tail values. The calibration factor values that result in the minimum differences are then stored.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

The disclosed method and apparatus improves the accuracy of models currently used to analyze the timing of circuit within an integrated circuit design. The impact of analog distorted waveform propagation (such as forward/backward Miller effect, long RC tail, high fanout nets and crosstalk) on timing has become a first order effect for new technology nodes. Existing models cannot always predict the gate level delay, slew and waveform computation for standard cells and complex gates with desired accuracy.

The currently disclosed method and apparatus uses a first model to calibrate a second model, thereby taking advantage of the strengths of the first model to improve areas of weakness in the accuracy of the second model. The disclosed method and apparatus uses the overlap between existing driver and load specific timing library data to significantly improve the accuracy of gate level delay, slew and waveform computation for standard cells and complex gates. After calibration of the second model, the first model is adjusted to account for residual differences between the first and second models that remain. This process is performed independently using slightly different strategies for the cell input side (i.e., receiver) and output side (i.e., driver) of each circuit to be modeled.

By using existing library data to improve the accuracy of the currently used models, no additions or modifications are needed to the library data that is currently available. That is, a major advantage of the disclosed method and apparatus is that it does not require the addition of any new characterization constructs in the timing library and uses already existing data to improve the accuracy of delay determination.

Figure 1:
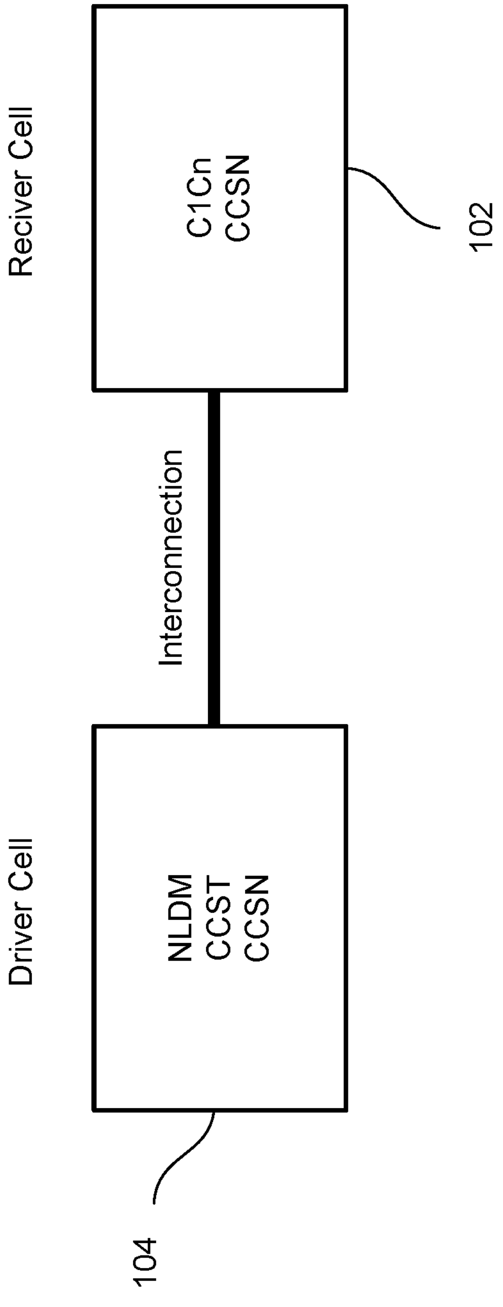
FIG. 1 is a simplified illustration of a driver cell and a receiver cell.

FIG. 1 is a simplified illustration of a receiver cell 102 and a driver cell 104. As noted above, a driver cell is defined as a cell that drives a signal into a load, such as the input of a receiver cell. Accordingly, a receiver cell is defined as a cell that receives a signal from a source, such as a driver cell. Cells of an integrated circuit design are characterised by data maintained in a timing library. In some embodiments of the library data associated with at least some of the driver cells used in the design includes parameters associated with the models used to analyze the timing of signals output from the driver cell. In some embodiments, three models are used to represent the driver cell 104. Each model has strengths and weaknesses that make that model more or less useful for analyzing different operational characteristics, such as gate level delay, slew and waveform computation, as a function of other parameters, such as the input slew and output load. Waveform computation refers to a vector of values that represent the voltage of a waveform at particular points in time (or with respect to one or more other parameters, such as input voltage when the waveform at issue is an output waveform). The three models that are used to represent the driver cell 104 are: (1) Nonlinear Delay Model (NLDM); (2) Composite Current Source for Timing (CCST); and (3) Composite Current Source for Noise (CCSN). In some embodiments, two models are used to represent the driver cell 104. The two models used to represent the receiver cell 102 are: (1) a multi-segment receiver capacitance model (C1Cn); and (2) a CCSN model.

Calibration Based Receiver Cell Modeling

Figure 2:
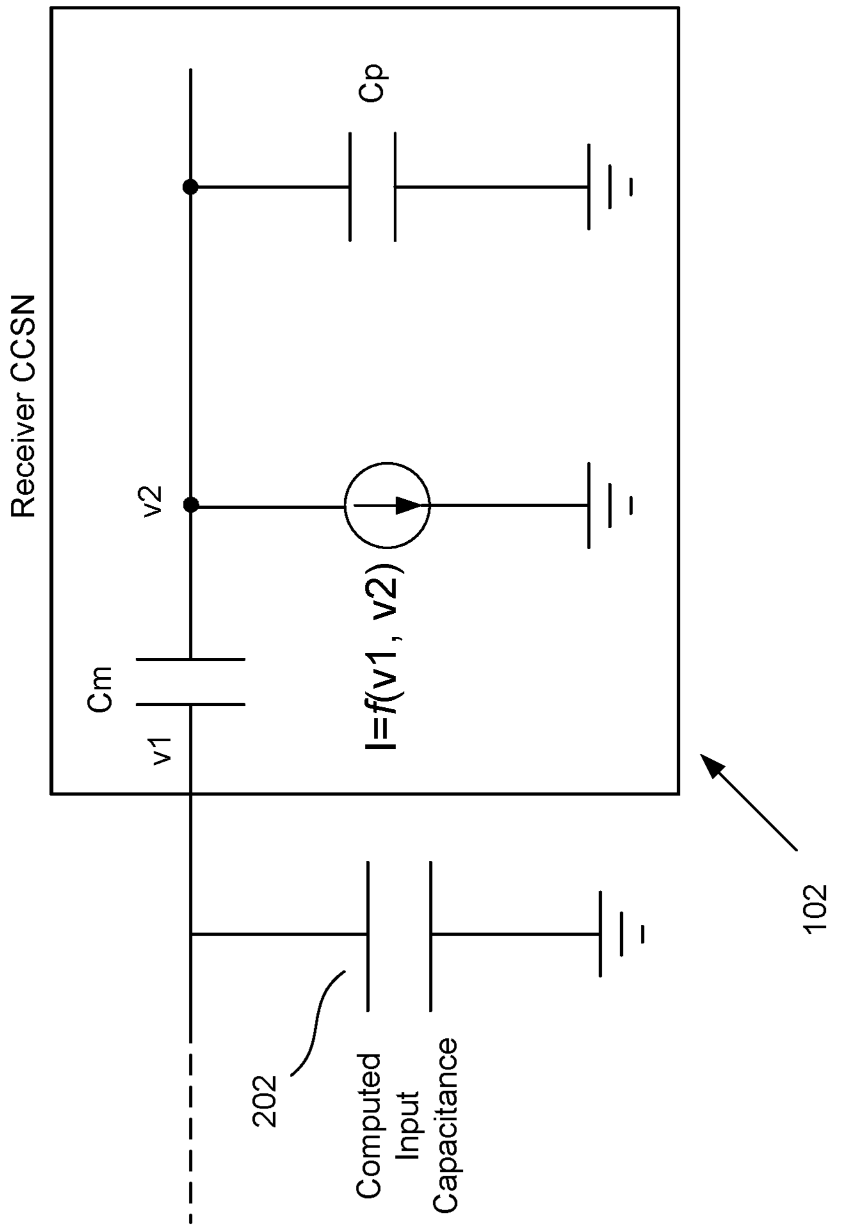
FIG. 2 is a schematic showing the receiver CCSN model.

FIG. 2 is a schematic showing the receiver CCSN model. In this example, there are three parameters in the model, the values of which are provided in or derived from a timing library file associated with the receiver cell 102. These parameters are: (1) Cm, the Miller capacitance; (2) current I, which is a function $f$ of the relationship between two voltages, v1 and v2, and (3) the pin capacitance, Cp to ground. In one embodiment, the first voltage, v1 is at the cell input side of Cm and the second voltage v2 is at the cell output side of Cm. The particular set of parameters shown are merely one example for the purpose of illustrating one example of how the disclosed method and apparatus might be implemented. In other embodiments there may be different, fewer or more parameters. In addition, a computed input capacitance 202 is shown. The computed input capacitance is the capacitance that is seen when looking into the CCSN model of the receiver cell 102.

Typically, the operation of the receiver cell is characterized by the values for these parameters to allow a designer to analyze how the receiver cell will perform when used in the intended design. A designer may select a particular receiver cell for the functional and operational characteristics of that cell which are the result of the values in the timing library file for that receiver cell. The values are typically established by a third party that created the receiver cell for use by the designer.

However, the model may be an inaccurate representation of the actual operation of the circuit that the model represents. Therefore, in accordance with the presently disclosed method and apparatus, the model can be calibrated to improve the accuracy of predictions of the operation of the receiver cell when the actual receiver cell is operating in the actual integrated circuit design.

The calibration is performed by comparing a computed input capacitance for the CCSN model with a value from a second model. In some embodiments, the second model is a C1Cn model within the library associated with the receiver cell. It should be noted that values for each of the models are provided in the library by the party that developed the receiver cell. The C1Cn model is a vector of input capacitance values, each having been determined by making actual measurements of a receiver cell under various conditions. In a multi-segmented model, the input signal is defined as having a set of segments, each segment starting at a first point on the input waveform and ending at a second point, and each point identified as a percent of the maximum voltage. Due to effects, such as the Miller effect, the input capacitance will vary when measured at each segment along the input waveform, as well as with different load conditions at the output of the receiver cell. When determining the values from the CCSN model, the values computed for the input capacitance of the CCSN model are made under the same conditions that were imposed on the receiver cell when measuring the C1Cn value to which that computed value is compared.

In some embodiments, calibration factors ($a_1$, $a_2$, $a_3$) are applied to the values of the three parameters of the CCSN model iteratively to cause the determined input capacitance to more closely match a value from the C1Cn model under the same load and input conditions imposed on the two models and for the same segment of the input signal. For example, the CCSN model can be calibrated by $a_1$Cm, $a_2$Cp, $a_3$I, wherein each of the parameters is calibrated by the respective calibration factor. The value will depend upon the accuracy of the CCSN model. Such values will be a positive non-integer number very close to one, either slightly greater or slightly less. When multiplied by the value for the respective parameter of the CCSN model, the result will be a value that increases the accuracy of the CCSN model. In other embodiments there may be different, fewer or more calibration factors. It should be noted that the comparison can be done for all values of the C1Cn model or on a per slew basis.

Figure 4A:
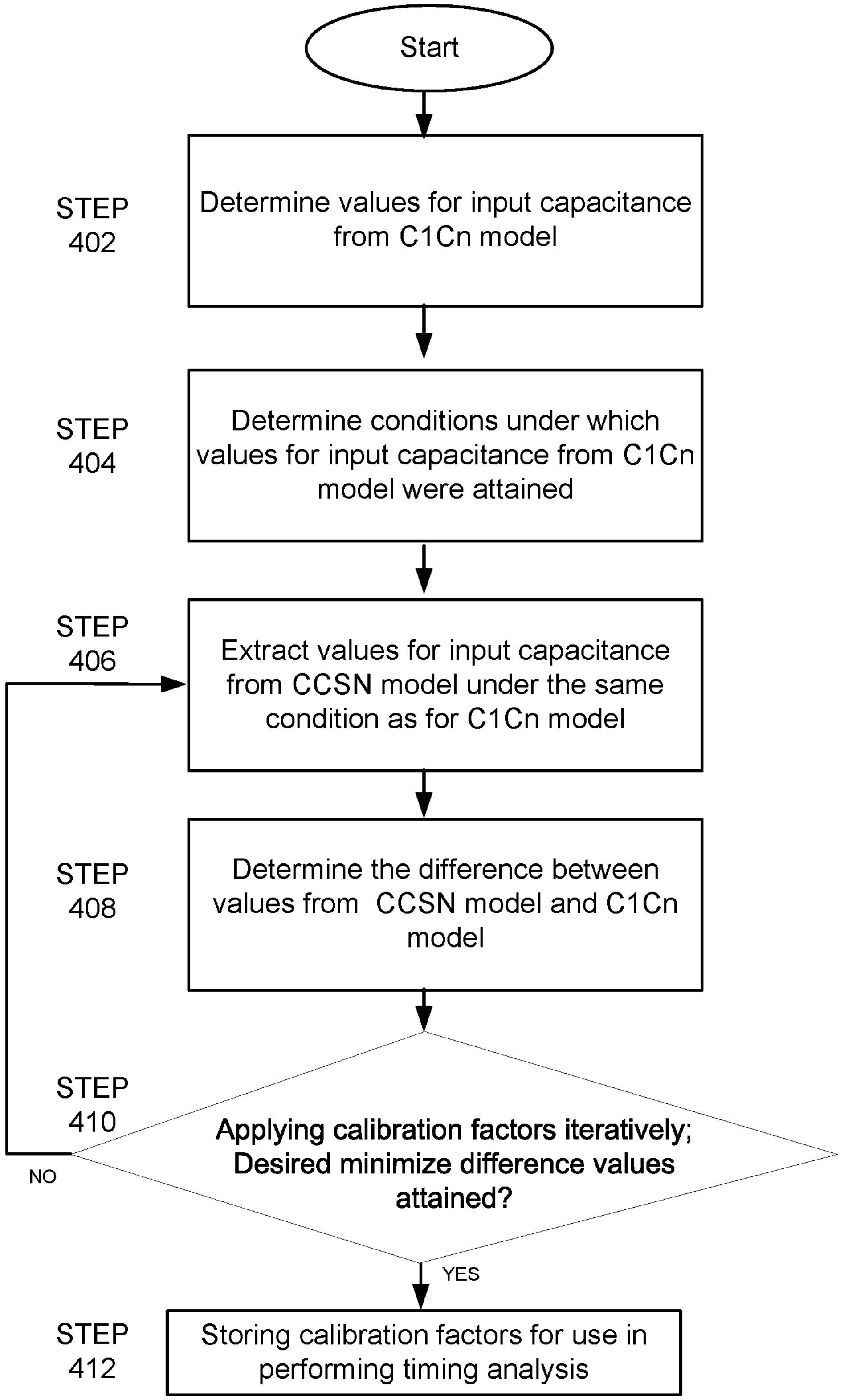
FIG. 4A is a flowchart of the presently disclosed method for calibrating a CCSN model of a receiver cell.

FIG. 4A is a flowchart of the presently disclosed method for calibrating a CCSN model of a receiver cell 102. Initially, values for the input capacitance of the receiver cell 102 (i.e., the cell loading that is imposed by the receiver cell on the net to which the receiver is connected) are determined from the C1Cn model (STEP 402). The C1Cn model has several values, each representing the input capacitance of the receiver cell under different conditions, such as input voltage levels (i.e., input slew) and output loads. The conditions under which the input capacitance values were measured are determined (STEP 404). In the case of look-up tables (LUTs) used in the C1Cn model, these conditions are the index used to recover the values from the LUT. Next, the input capacitance values of the CCSN model are extracted by applying the same conditions used when measuring the C1Cn values (STEP 406). That is, the CCSN model is used to determine the receiver cell capacitance based on the values of the parameters in the model with the same input slew and output loading. Next, the difference between values from the CCSN model and values from the C1Cn model are determined (STEP 408). After determining the differences, applying calibration factors iteratively and determining whether minimization of the difference in values from CCSN model and C1Cn model have been attained (STEP 410). In accordance with one embodiment, a starting value is set for each calibration factor associated with each parameter of the CCSN model. The computed capacitance is then checked and an error vector determined to see whether the model is more or less accurate. Adjustments are them made to the parameters based on the new error vector. Each time a set of calibration values is determined the process repeats until the error vector is within an acceptable range. Typically, such iterative search algorithms adjust one parameter to find a local minimum, and then move to a next parameter. However, there are many algorithms for performing this type of search and optimization. Various values for the calibration factors can be tried and iteratively adjusted until there is a convergence on a minimum difference value. Each time the calibration factors change, the process returns to STEP 406 and the receiver capacitance is again determined from the CCSN model and the difference is again determined (STEP 408). The C1Cn model has several values, each associated with a particular set of conditions, such as input slew and output load, as well as being associated with a particular portion of the receiver input waveform. Therefore, determining whether the differences are an improvement over the previous difference may be dependent upon the particular goals of the IC circuit designer. In some embodiments, the determination as to whether the difference has been sufficiently minimized may be made on the basis of a subset of all of the compared difference values. In some embodiments, particular difference values may be given more weight than other difference values. Once the difference is determined to be sufficiently small (i.e., a minimum difference is determined), the calibration factor values that result in the minimum difference are stored for use in performing timing analysis (STEP 412).

Receiver Cell C1Cn Adjustment

Figure 3:
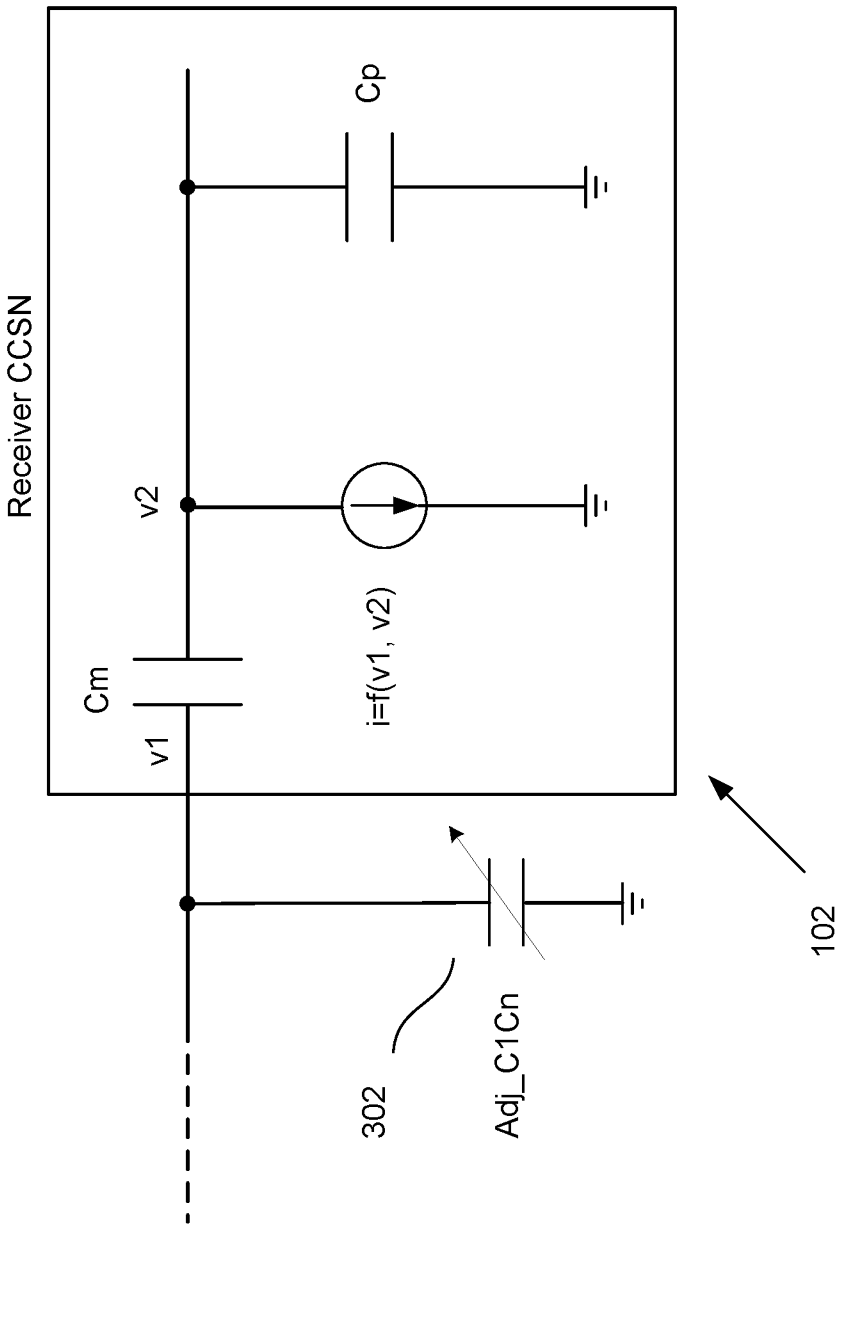
FIG. 3 shows one example of the adjustment made to the C1Cn value.

In some embodiments, once the calibration is complete, a residual difference may still exist between the input capacitance determined for the calibrated CCSN model and the values of the C1Cn model. FIG. 3 shows one example of the adjustment made to the C1Cn value. In some embodiments, a C1Cn adjustment values 302 are then used to adjust the C1Cn values to match the input capacitance values determined for the CCSN model. The adjusted C1Cn values are stored and used during receiver simulation along with the calibrated CCSN model. In other embodiments, the values for the input capacitance may be adjusted without having performed the calibration procedure.

Figure 4B:
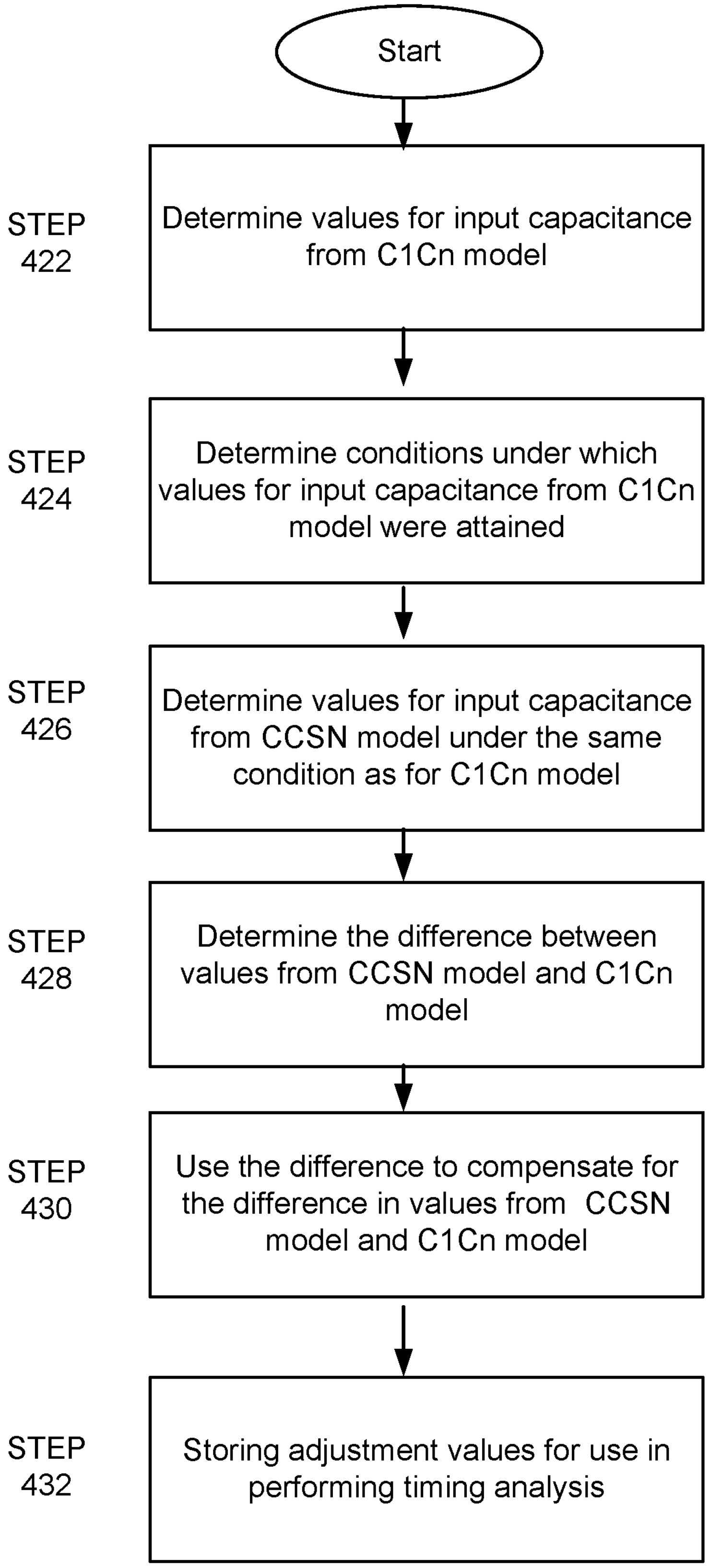
FIG. 4B is a flowchart of the presently disclosed method for determining adjustment values to be used with the values of the C1Cn model.

FIG. 4B is a flowchart of the presently disclosed method for determining adjustment values to be used with the values of the C1Cn model. Initially, values for the input capacitance are determined from the C1Cn model (STEP 422). The conditions under which the input capacitance values were measured are determined (STEP 424). Next, the input capacitance values of the CCSN model are determined by applying the same conditions used when measuring the C1Cn values (STEP 426). Next, the difference in values from CCSN model and C1Cn model are determined (STEP 428). After determining the differences, using the difference to determine an adjustment value (STEP 430). Once adjustment values are determined, they are stored to be applied directly to the C1Cn values when performing timing analysis (STEP 432). Receiver model calibration or receiver model adjustment may be applied individually or combined.

Calibration Based Driver Cell Modeling

Figure 5:
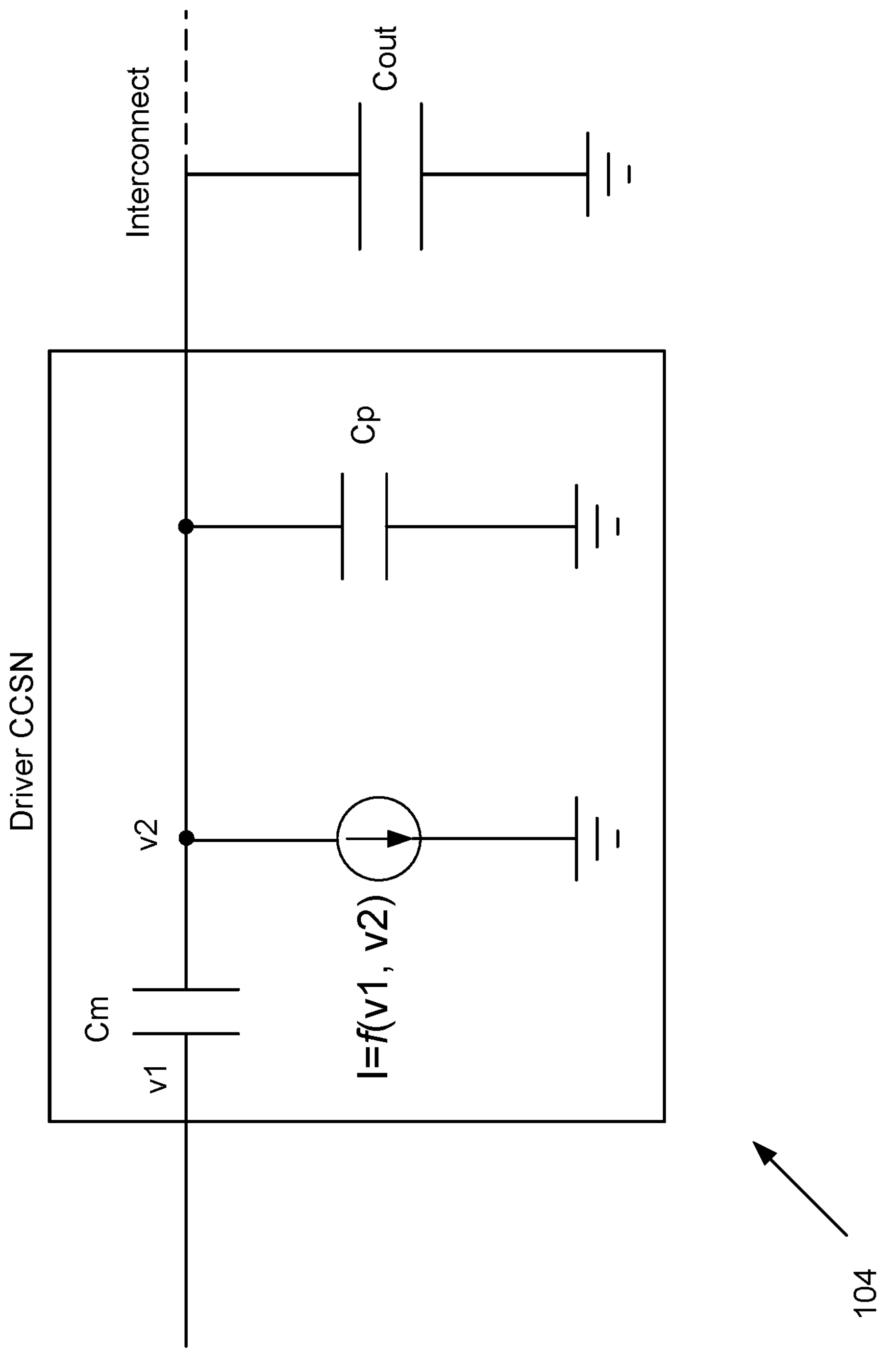
FIG. 5 shows a driver cell CCSN model for a driver cell.

FIG. 5 shows a driver cell CCSN model for a driver cell 104. As was the case with regard to the receiver cell CCSN model, the number of parameters used in the model may vary from that shown and described in the examples presented. Using a method and apparatus that varies slightly from that described above with respect to the receiver cell, a CCSN model representing a driver cell can be calibrated using data from an NLDM model and a CCST model. These two models each use an LUT to characterize the signal at the output of the driver cell in response to pre-defined library characterization waveforms. The CCSN model representing a driver cell 104 can be calibrated using data from an NLDM model and a CCST model by attaining values for the driver delay and slew from the LUTs associated with the NLDM model. In addition, the values in the LUTs of the CCST model are used to determine waveform tails for the driver cell 104. Driver delay and slew values are then determined from the CCSN model of the driver cell 104 for input and output conditions that match the pre-defined library characterization waveforms used to populate the LUTs of the NLDM model in the driver cell library. In addition, waveform tails for the driver cell 104 are determined for the CCSN model if the driver cell under the same input and load conditions assumed for the pre-defined library characterization waveforms used to populate the CCST LUTs. Each of these values can be determined for any input signal applied to the input of the driver cell 104 using the CCSN models provided in the library of the driver cell 104, including the pre-defined library characterization waveforms used to populate the LUTs.

The values from the LUTs of the NLDM and the CCST models are compared to the values determined from the CCSN model to determine difference values. An iterative process is used to converge on values for driver cell CCSN calibration factors ($b_1$, $b_2$, $b_3$) that when applied to the three parameters of the CCSN model will reduce the difference value of the delay, slew, and waveform tails. In other embodiments there may be different, fewer or more calibration factors. As is the case for the receiver cell calibration, calibration of the driver cell CCSN can be performed for all of the data in the respective LUTs of the NLDM and CCST model, or on selected slews and/or selected load values.

Figure 6A:
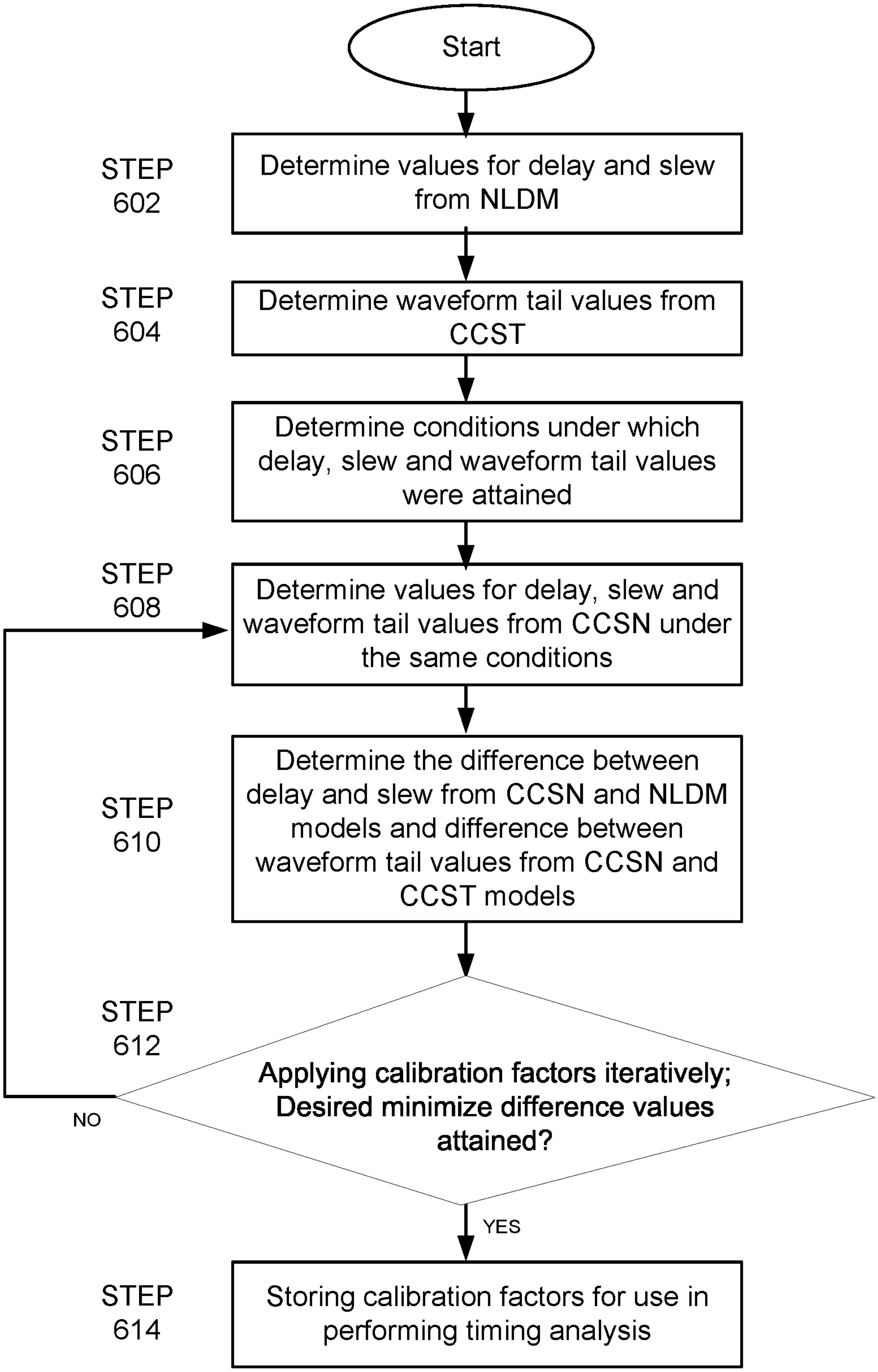
FIG. 6A is a flowchart of one embodiment of the presently disclosed method for calibrating a CCSN model of a driver cell.

FIG. 6A is a flowchart of one embodiment of the presently disclosed method for calibrating a CCSN model of a driver cell 104. The NLDM model has a LUT with several values, each representing the output signal of the driver cell under conditions determined in the pre-defined library characterization waveforms. The data in the NLDM LUT is used to determine the delay and slew of the driver cell (STEP 602). In addition, waveform tail values are extracted from the CCST model LUT (STEP 604). The conditions associated with pre-defined library characterization waveforms used to generate the data for both the NLDM and CCST LUTs is determined (STEP 606). These conditions are the index used to recover the values from the LUT.

Next, the delay, slew and waveform tail values of the driver cell as determined by the CCSN model are determined by applying the same conditions associated with the pre-defined library characterization waveforms (STEP 608). The difference: (1) between delay and slew from CCSN model and delay and slew from the NLDM model; and (2) between the waveform tail values from CCSN and the waveform tail values from the CCST model, are then determined (STEP 610).

After determining the differences, calibration factors are iteratively applied to the parameters of the CCSN model to minimize the differences between the values determined using the CCSN model and the values determined using the NLDM and CCST models (STEP 612). Various values for the calibration factors can be tried and iteratively adjusted until there is a convergence on a minimum difference for the delay, slew and waveform tail values. If the desired minimum values have not been attained, then the process returns to STEP 608. If the minimum difference are within the desired range, then calibration factor values are set, the calibration factors are stored for use in performing timing analysis (STEP 614). The NLDM and the CCST models have several values, each associated with a particular set of conditions, such as input slew and output load, as well as being associated with a particular portion of the driver output waveform. Therefore, determining whether the differences are an improvement over the previous difference may be dependent upon the particular goals of the IC circuit designer. In some embodiments, the determination as to whether the difference has been sufficiently minimized may be made on the basis of a subset of all of the compared difference values. In some embodiments, particular difference values may be given more weight than other difference values.

CCSN Compensation

In some embodiments, once the calibration factors (b1, b2, b3) have been established, the driver delay, slews and waveform tails as determined using the CCSN model are once again compared to the values stored in the respective LUTs of the NLDM and CCST models to determine any residual difference that remains. In other embodiments, compensation can be performed without performing calibration. In either case, a compensation value for each value of delay, slew and values for the waveform tail data can then be stored to be applied directly to the delay, slew and waveform tail data after stage simulation. It should be noted that the term compensation is used with regard to the final correction made in the driver cell, because this is a correction to the resulting timing values that we're attempting to determine with the model. In contrast, in the receiver cell adjustment, the adjustment is made to the receiver capacitance, which is in turn used to assist in making a more accurate model that will yield the timing values that are ultimately the goal.

Figure 6B:
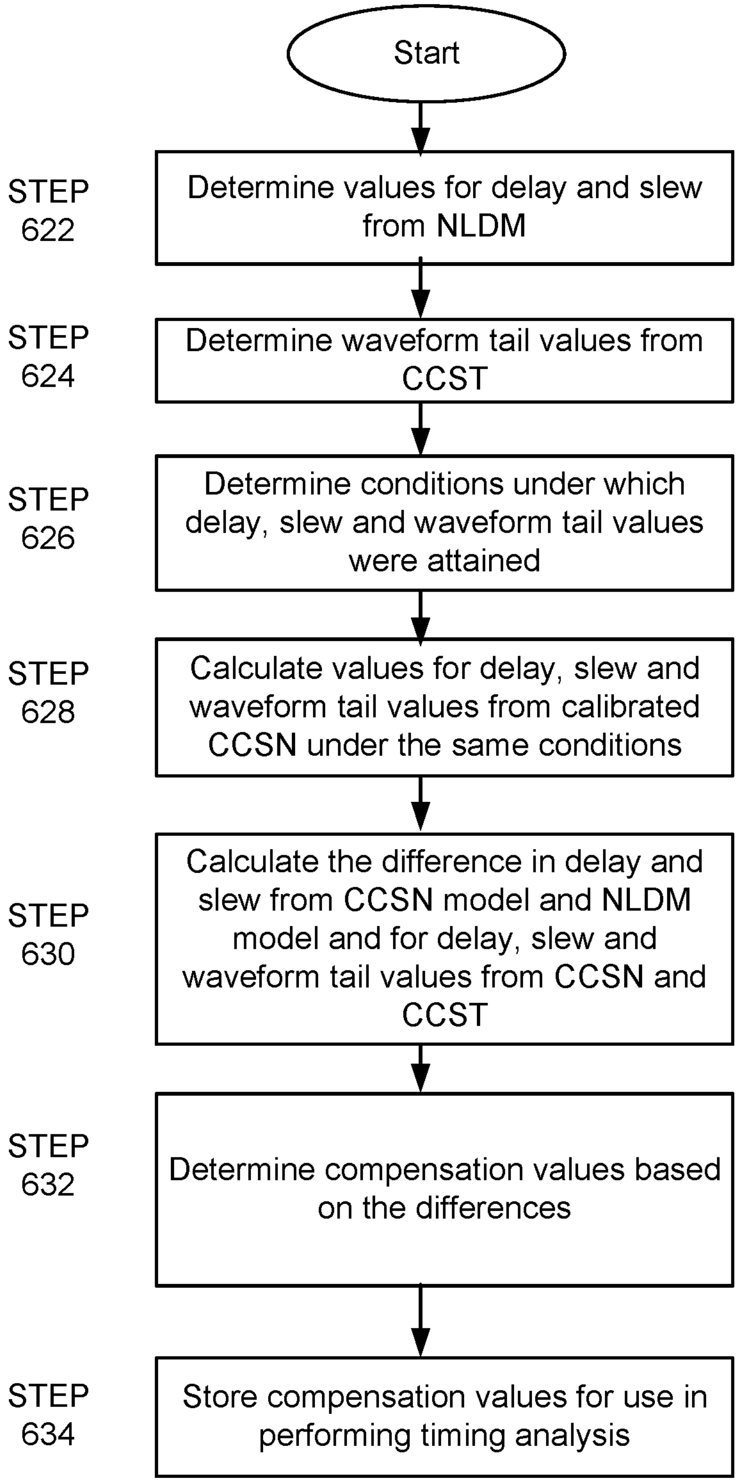
FIG. 6B is a flowchart of one embodiment of the presently disclosed method for performing a post calibration compensation to the delay, slew and waveform tail values determined from a CCSN model of a driver cell.

FIG. 6B is a flowchart of one embodiment of the presently disclosed method for performing a post calibration compensation to the delay, slew and waveform tail values determined from a CCSN model of a driver cell 104. The data in the NLDM LUT is again used to determine the delay and slew of the driver cell (STEP 622). In addition, waveform tail values are again extracted from the CCST model LUT (STEP 624). In some embodiments, the values previously extracted from the LUTs during the calibration are used to compensate for residual errors. The conditions associated with pre-defined library characterization waveforms used to generate the data for both the NLDM and CCST LUTs is determined (STEP 626).

Next, the delay, slew and waveform tail values of the driver cell are determined by applying the same conditions associated with the pre-defined library characterization waveforms to the calibrated CCSN model (STEP 628). The difference: (1) between delay and slew from CCSN model and delay and slew from the NLDM model; and (2) between the waveform tail values from CCSN and the waveform tail values from the CCST model, are then determined (STEP 630).

After determining the differences, compensation values for the delay, slew and waveform tail values are determined based on the residual differences (the differences that remain after calibration) between the values determined using the CCSN model and the values determined using the NLDM and CCST models (STEP 632). The compensation values are then stored for use in performing timing analysis (STEP 634). As noted above, the difference between the calibration factors and the compensation values is that the calibration factors are applied as a coefficient to the parameters in the CCSN model and are determined iteratively in order to minimize the difference between the delay, slew and waveform tail values of the driver cell as determined from the CCSN model and the NLDM and CCST models. In contrast, the compensation values are applied directly to the delay, slew and waveform tail values of the driver cell to compensate for slight residual errors in those values.

It should be further noted that the values determined by the NLDM and CCST models are very accurate for the particular conditions of the pre-defined library characterization waveforms, but these models will be less accurate with other waveforms for which data was not collected. Furthermore, while these inaccuracies are typically small, they may be significant in designs implemented to operate at low voltages and to be fabricated at very small technology nodes. Driver model calibration or driver model compensation may be applied individually or combined.

Figure 7:
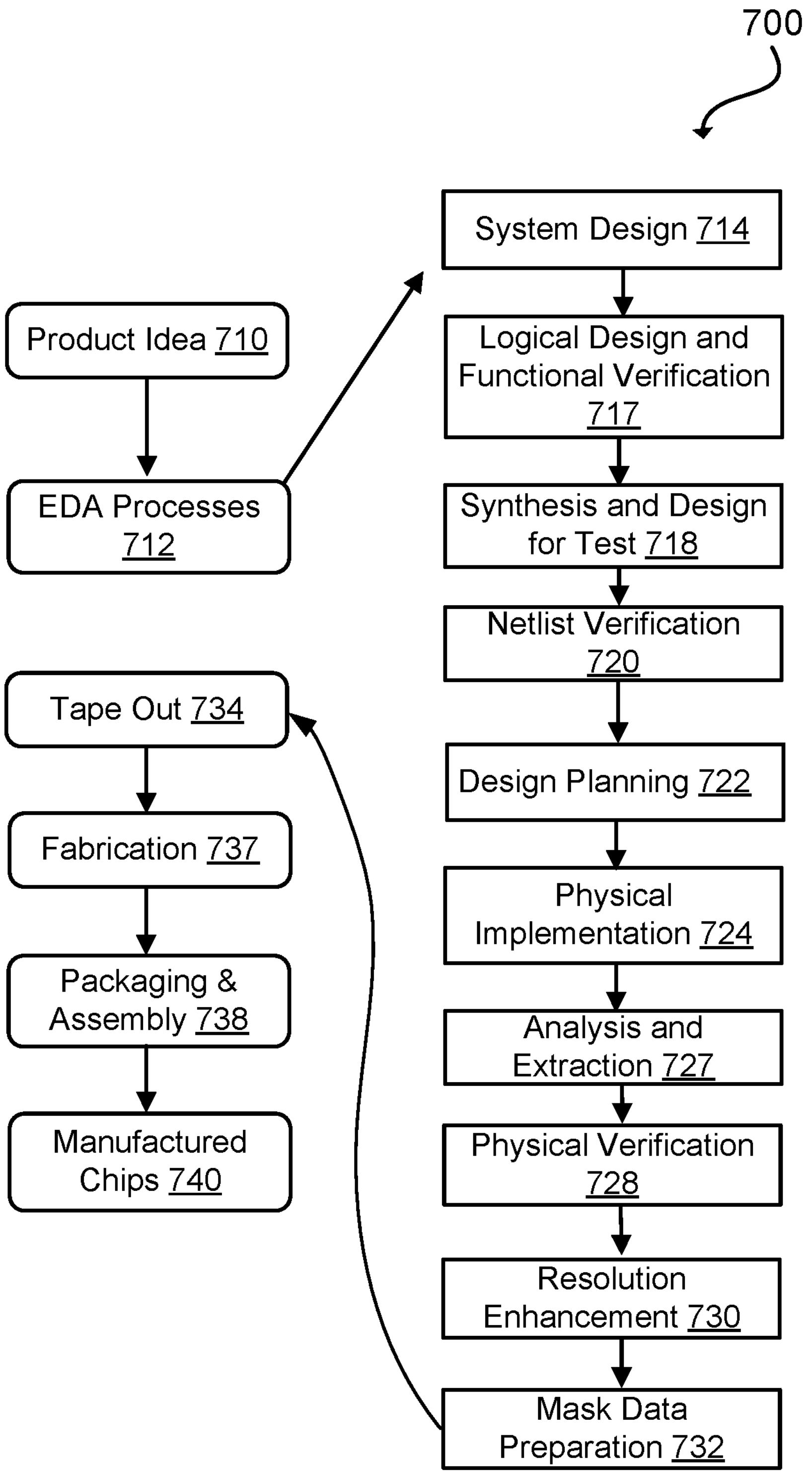
FIG. 7 illustrates an example set of processes used during the design, verification, and fabrication of an article of manufacture, such as an integrated circuit, to transform and verify design data and instructions that represent the integrated circuit.

FIG. 7 illustrates an example set of processes 700 used during the design, verification, and fabrication of an article of manufacture, such as an integrated circuit, to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer. The information is transformed to create an article of manufacture that uses a set of EDA processes 712. When finalized, the design is taped-out 734 and artwork (e.g., geometric patterns) for the integrated circuit is sent to a fabrication facility to manufacture a mask set. The mask set is then used to manufacture an integrated circuit. After tape-out, a semiconductor die is fabricated 736 and packaging and assembly processes 738 are performed to produce a finished integrated circuit 740.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 7. The processes described by be enabled by EDA products (or tools).

During system design 714, functionality of an integrated circuit to be manufactured is specified. The design may be optimized for desired characteristics, such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used throughout this disclosure, the term "cell" specifies a set of transistors, other components, and interconnections that provide a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products. These libraries contain the CCSN, NLDM, CCST, and C1Cn models referenced above.

During analysis and extraction 727, the circuit function is verified at the layout level, which permits refinement of the layout design. The method and apparatus disclosed above for improving the accuracy of the CCSN models for receiver cells and driver cells may be implemented at this time. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured. The method and apparatus disclosed above for improving the accuracy of the CCSN models for receiver cells and driver cells may be implemented again at this time.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 800 of FIG. 10) may be used to store the programs and data structures that are used by some or all of the EDA products described herein, and products used for development of cells for the library and for physical and logical design that use the library.

Figure 8:
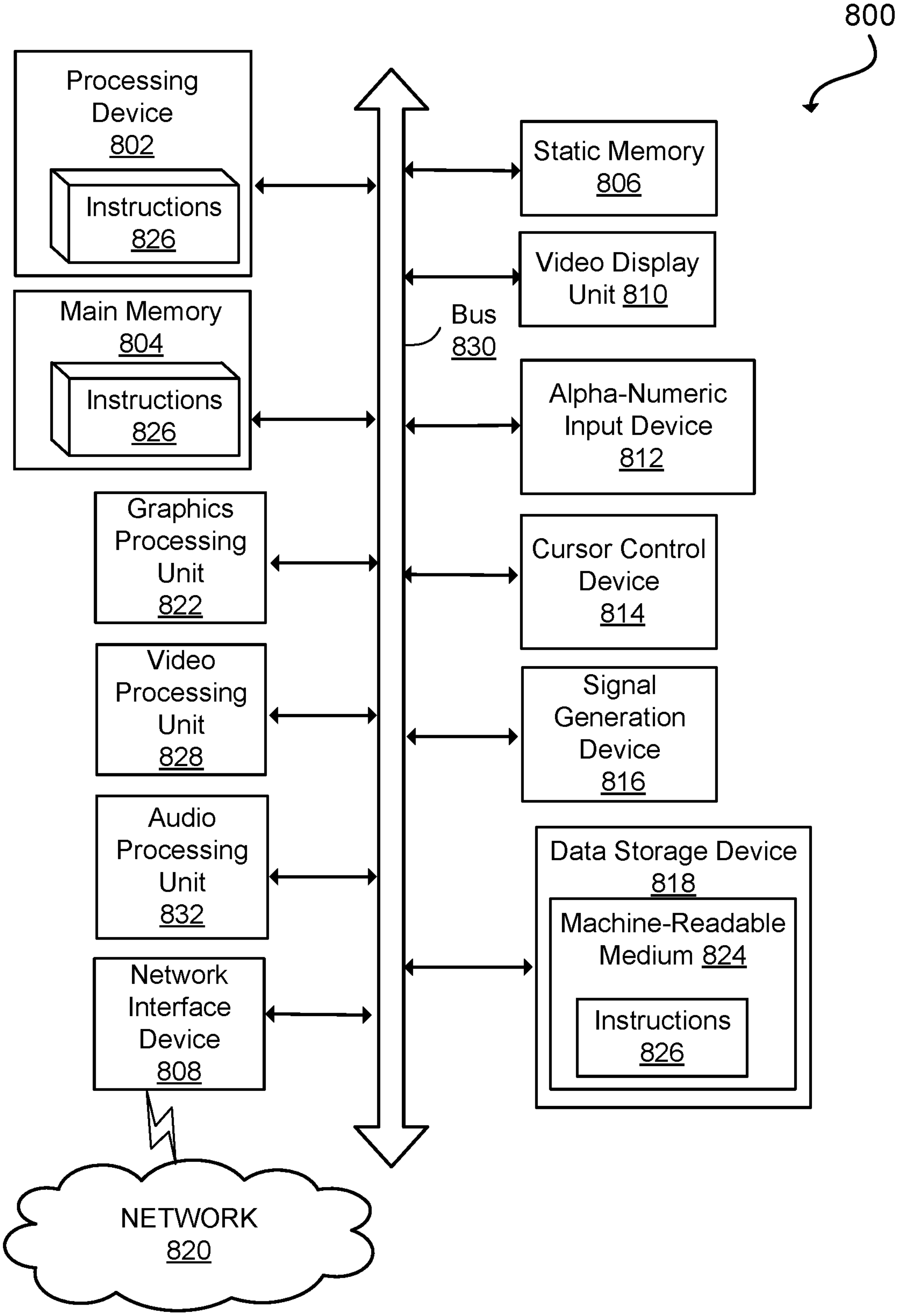
FIG. 8 illustrates an example machine of a computer system within which a set of instructions, for causing the machine to perform any one or more of the methodologies discussed herein, may be executed.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM), a static memory 806 (e.g., flash memory, static random access memory (SRAM), etc.), and a data storage device 818, which communicate with each other via a bus 830.

Processing device 802 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 may be configured to execute instructions 826 for performing the operations and steps described herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a non-transitory computer-readable medium) on which is stored one or more sets of instructions 826 or software embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In some implementations, the instructions 826 include instructions to implement functionality corresponding to the present disclosure. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 802 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:

determining first receiver capacitance values for a receiver cell of an integrated circuit design from a multi-segment receiver capacitance (C1Cn) model, at a condition;

extracting second receiver capacitance values of the integrated circuit design based on a Composite Current Source for Noise (CCSN) model of the integrated circuit design at the condition, the CCSN model having three parameters: (a) a Miller capacitance parameter, (b) a current parameter which is a function of a relationship between a first voltage and a second voltage, and (c) a pin capacitance parameter;

determining difference values for differences between the first receiver capacitance values of the integrated circuit design and the second receiver capacitance values of the integrated circuit design;

adjusting, by a processing device, calibration factor values iteratively to adjust the parameters of the CCSN model until the difference values are within a desired range; and performing a signal timing analysis of a circuit comprising the receiver cell of the integrated circuit design, the signal timing analysis comprising computing a response of the receiver cell to an input waveform using the parameters of the CCSN model as adjusted by the calibration factor values to compute timing values of the receiver cell.

2. The method of claim 1, wherein the receiver cell has a Miller capacitance and wherein the Miller capacitance parameter represents the Miller capacitance of the receiver cell.

3. The method of claim 1, wherein the receiver cell has pin capacitance and the pin capacitance parameter represents the pin capacitance of the receiver cell.

4. The method of claim 1, wherein the receiver cell has a cell current that is the function of the first voltage and the second voltage, and the current parameter represents the cell current of the receiver cell.

5. The method of claim 4, wherein the receiver cell has a Miller capacitance, and wherein the first voltage is at the receiver cell at an input side of the Miller capacitance and the second voltage is at the receiver cell at an output side of the Miller capacitance.

6. The method of claim 1, further comprising:

determining third receiver capacitance values for the receiver cell after the model of the receiver cell has been calibrated, the third receiver capacitance values being determined from the CCSN model under conditions used to extract the first receiver capacitance values for the C1Cn model;

determining a residual difference between the first receiver capacitance values and the third receiver capacitance values;

determining an adjustment value for the third receiver capacitance values based on the residual difference between the first receiver capacitance values and the second receiver capacitance values; and storing the adjustment value.

7. The method of claim 6, wherein the receiver cell is calibrated by applying the calibration factor values to respective parameters of the CCSN model.

8. The method of claim 7, wherein applying the calibration factor values includes multiplying the calibration factor values by the respective parameters of the CCSN model to obtain calibrated parameters.

9. The method of claim 1, the integrated circuit design including cells, which include the receiver cell and a driver cell, the receiver cell receiving input from the driver cell, the cells of the integrated circuit design being associated with data maintained in a timing library that is shared by the C1Cn model and the driver cell.

10. The method of claim 1, further comprising:

generating a hardware description language (HDL) netlist of the integrated circuit design, based on the calibration factor values that result in the difference values being within the desired range, wherein the generated HDL netlist is an improvement over an HDL netlist generated based only on the C1Cn model and over an HDL netlist generated based only on the CCSN model.

11. The method of claim 1, wherein the signal timing analysis comprises a simulation of the circuit comprising the receiver cell of the integrated circuit design to compute the timing values.

12. The method of claim 1, wherein the signal timing analysis comprises a static HDL check of the HDL netlist of the integrated circuit design to compute the timing values and to verify the timing values for compliance with timing constraints.

13. A system comprising:

a memory storing instructions; and a processor, coupled with the memory to execute the instructions, the instructions, when executed, cause the processor to:

determine first receiver capacitance values for a receiver cell of an integrated circuit design, from a multi-segment receiver capacitance (C1Cn) model of the integrated circuit design;

determine second values for receiver capacitance from a Composite Current Source for Noise (CCSN) model of the integrated circuit design under conditions used to attain receiver capacitance values for the C1Cn model;

determine a difference between the first receiver capacitance values and the second receiver capacitance values;

generate calibration factors to be applied iteratively to parameters of the CCSN model to determine a minimum difference between the first receiver capacitance values and the second receiver capacitance values, wherein the CCSN model has three parameters: a Miller capacitance parameter, a current parameter, which is a function of a relationship between a first voltage and a second voltage, and a pin capacitance parameter; and generate timing values of the receiver cell through a signal timing analysis of a circuit comprising the receiver cell of the integrated circuit design, the timing analysis comprising computing a response of the receiver cell to an input waveform using the parameters of the CCSN model as adjusted by the calibration factors.

14. The system of claim 13, where the instructions, when executed, cause the processor to further:

determine third receiver capacitance values for the receiver cell after a model of the receiver cell has been calibrated, the third receiver capacitance values being determined from the CCSN model under conditions used to attain the first receiver capacitance values;

determine a residual difference between the first receiver capacitance values and the second receiver capacitance values;

determine an adjustment value for the third receiver capacitance values based on the residual difference between the first receiver capacitance values and the third receiver capacitance values; and store the adjustment value.

15. The system of claim 13, wherein the signal timing analysis comprises a simulation of the circuit comprising the receiver cell of the integrated circuit design to compute the timing values.

16. The system of claim 13, wherein the signal timing analysis comprises a static HDL check of the HDL netlist of the integrated circuit design to compute the timing values and to verify the timing values for compliance with timing constraints.

17. A method comprising:

determining first receiver capacitance values for a receiver cell of an integrated circuit design from a multi-segment receiver capacitance (C1Cn) model, at a condition;

extracting second receiver capacitance values of the integrated circuit design based on a Composite Current Source for Noise (CCSN) model of the integrated circuit design at the condition, the CCSN model being based on parameters comprising: (a) a Miller capacitance parameter, (b) a current parameter which is based on a first voltage at a first point in the integrated circuit design and a second voltage at a second point in the integrated circuit design, and (c) a pin capacitance parameter;

determining a discrepancy value, representing a discrepancy between the first receiver capacitance values of the integrated circuit design and the second receiver capacitance values of the integrated circuit design;

adjusting, by a processing device, calibration factor values iteratively to adjust the parameters of the CCSN model until the discrepancy values are within a desired range; and performing a signal timing analysis of a circuit comprising the receiver cell of the integrated circuit design, the signal timing analysis comprising computing a response of the receiver cell to an input waveform using the parameters of the CCSN model as adjusted by the calibration factor values to generate timing values of the receiver cell to compute timing values of the receiver cell.

18. The method of claim 17, wherein the signal timing analysis comprises a simulation of the circuit comprising the receiver cell of the integrated circuit design to compute the timing values.

19. The method of claim 17, wherein the signal timing analysis comprises a static HDL check of the HDL netlist of the integrated circuit design to compute the timing values and to verify the timing values for compliance with timing constraints.

* * * * *